F. Lunkenheimer,
Globe Valve,
Nº 46,685. Patented Mar. 7, 1865.

Witnesses
Wm Trewin
Theo Tusch

Inventor;
F. Lunkenheimer
per Munn & Co
Attorneys

UNITED STATES PATENT OFFICE.

F. LUNKENHEIMER, OF CINCINNATI, OHIO.

IMPROVEMENT IN GLOBE-VALVE COCKS.

Specification forming part of Letters Patent No. 46,685, dated March 7, 1865.

*To all whom it may concern:*

Be it known that I, F. LUNKENHEIMER, of Cincinnati, in the county of Hamilton and State of Ohio, have invented a new and Improved Globe-Valve Cock; and I do hereby declare that the following is a full, clear, and exact description thereof, which will enable those skilled in the art to make and use the same, reference being had to the accompanying drawings, forming part of this specification, in which—

Figure 1:
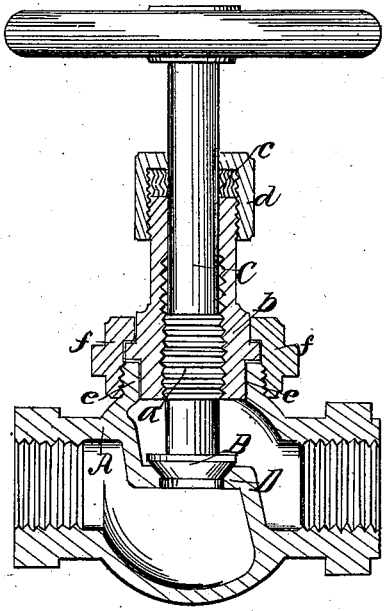
Figure 2:
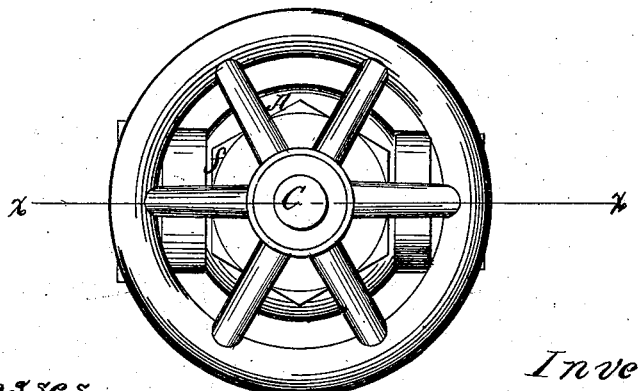

Figure 1 represents a central section of this invention, the line $x\ x$, Fig. 2, indicating the plane of section. Fig. 2 is a plan or top view of the same.

Similar letters of reference indicate corresponding parts.

In grinding the valve, in a globe-valve of the ordinary construction, the nut has to be unscrewed in order to be able to turn the valve in the seat, and when the nut is unscrewed there is nothing to guide the stem, and the operation of grinding is uncertain and difficult. If the nut is made separate from the stuffing-box, the construction is rendered complicated, and during the operation of grinding the valve-spindle is liable to turn in the nut, giving to the valve a rising and falling motion, which prevents it from grinding in its seat.

In my improved valve the turning of the spindle in its nut is prevented by the stuffing-box, and as soon as the cap is removed the valve can be ground down with the greatest ease. This defect has been sought to be corrected by making the nut fitting on the valve-spindle separate from the stuffing-box. The nut is provided with a flange, which bears on a shoulder in the body or shell of the valve, being held down by a cap, the upper or outer part of which is bored out to receive the stuffing-box. By this arrangement the construction of the valve is rendered complicated and the number of joints is increased, but the difficulty sought to be overcome is not avoided. In grinding the valve the spindle turns in the nut, there being nothing to hold the latter, and the valve rises and falls the same as in the ordinary valve, or if the valve is pressed down in its seat the nut assumes a spiral motion which interferes with the grinding operation.

All these difficulties are overcome by this present invention, which consists of a globe-valve in which the nut and stuffing-box for the valve-stem are made one, the same as in the ordinary globe-valve, but the nut instead of being provided with a screw-thread on its outer surface is turned off smooth and fitted into a socket in the body or shell of the globe-valve, and it is held down by means of a cap fitting over the outside of the nut and socket in such a manner that when said cap is unscrewed the friction of the spindle in the stuffing-box prevents the same from turning in the nut and the valve can be ground with the greatest ease and precision, the nut itself turning with it and forming the guide during the operation of grinding.

A represents the body or shell of a globe-valve made of brass, composition, or any other suitable material. B is the valve, which is cast or otherwise made solid with the stem C, and it is ground down in the seat D, so as to make an air or steam tight joint. The valve-stem is provided with a screw-thread, $a$, which screws into the nut $b$, and the upper portion of this nut forms a stuffing-box, $c$, which is filled with suitable packing held in place by a cap, $d$, as clearly shown in Fig. 1, and precisely in the same manner as in globe-valves of the ordinary construction.

The inner end of the nut $b$, instead of being provided on its outer surface with a screw-thread, is turned off smooth and fitted nicely into the socket $e$ of the shell A, and said nut is provided with a flange which projects over the edge of the socket, as clearly shown in the drawings. A cap, $f$, which fits over the outside of the nut and flange, is provided on its inner circumference with a screw-thread to screw on a corresponding screw-thread on the outside of the socket. By screwing this cap down the nut $b$ is rendered rigid with the shell, and the valve opens and closes in the ordinary manner. If the valve is to be ground, the cap $f$ is unscrewed, and the valve, being prevented from turning in the nut by the friction of the stem in the stuffing-box, can be ground down with the greatest precision. The nut $b$, fitting in the socket $e$, forms a guide during the operation of grinding, and the cap $f$, being screwed over the outside of the socket $e$, strengthens the latter and obviates stretching the thread, as all valves are apt to do when the nut is screwed inside the globe, and, furthermore, said cap being properly fitted over the nut, assists materially in grinding the valve to its seat accurately.

I claim as new and desire to secure by Letters Patent—

A globe-valve in which the nut and stuffing-box for the valve-stem are made of one piece or rigidly connected the same as in an ordinary globe-valve, but the nut, instead of being provided on its outer surface with a screw-thread, is turned off smooth and fitted in the socket of the shell, where it is held by a cap, substantially in the manner and for the purpose set forth.

F. LUNKENHEIMER.

Witnesses:
JOHN W. FIDLER,
THOMAS AITKEN.